INVENTOR.
KEITH C. CONVERSE
BY John H. Widdowson
ATTORNEY

Nov. 11, 1969  K. C. CONVERSE  3,477,519
DEPTH CONTROL APPARATUS

Filed Dec. 8, 1965  3 Sheets-Sheet 3

INVENTOR.
KEITH C. CONVERSE
BY John H. Widdowson
ATTORNEY

United States Patent Office 3,477,519
Patented Nov. 11, 1969

3,477,519
DEPTH CONTROL APPARATUS
Keith C. Converse, Pawnee Rock, Kans. 67567
Filed Dec. 8, 1965, Ser. No. 512,435
Int. Cl. A01b 63/04; F16c 1/10; G05g 1/04
U.S. Cl. 172—315          5 Claims

ABSTRACT OF THE DISCLOSURE

This invention is a depth control apparatus connected to an adjusting lever secured to a crank axle on a tractor with the lever movable to change the depth of soil working. More particularly, this invention is a means to rotate an axle having biasing means urging the same in one direction and a winch and control means selectively moving the same in the opposite direction. More specifically, this invention is a means to regulate depth of soil working of a farm implement having means biasing the same in one direction; winch means adjustably moving the same in the opposite direction; and an adjustable chain means interconnecting the same to readily regulate the resultant movement achieved therefrom.

Many devices are known to the prior art for changing the operating depth of an earthworking implement such as a plow or the like. Most plows and associated implements come equipped with a hand operable lever which is maintained in position by a ratchet device to regulate the operable depth of the implement. It has been found that it is necessary for the operator to stop the implement to make the proper depth adjustment. If the lever is elongated so that the operator can reach it from his tractor seat or the like, it interferes with the tractor or the operator while turning. Hydraulic systems are well known to the art for changing the operating depth of an earthworking implement, however these systems are quite expensive and complicated. Other systems for changing depth of operation on an earthworking implement are known to the prior art but are quite intricate and complicated.

I have invented a new depth control apparatus for use on an earthworking implement which has a crank axle and disengageable lever to rotate the axle for adjustment of the depth of the operation of the implement. My apparatus provides means to move the depth control lever when it is in a disengaged position, which is mountable between the implement and the lever and which urges the crank axle into an elevated position. Actuating means are mountable on the implement and have means to connect same to the lever. Control means are mountable on a tractor seat or the like, and connecting means are operably mountable between the control means and the actuating means. The apparatus is constructed and adapted when mounted to operate to change the operating depth of the tool of the earthworking implement.

The depth control apparatus of my invenion overcomes the problems inherent in the apparatus of the prior art. My apparatus allows an operator of a tractor or the like when pulling an earthworking implement such as a plow to change the depth of the operation of the earthworking implement while in motion. This becomes important in situations where the conditions of the ground being worked are variable, causing greater and/or lesser loads on the vehicle pulling the implement. When the tractor starts to become overloaded, the operator, by use of my invention, can readily and easily lessen the depth of operation of the implement by manipulation of my apparatus when in motion. By rotating the crank on the hand winch on the tractor seat, the operator can raise the operating depth of the implement until the desired depth is achieved. When the overloading soil condition has been passed through, the operator can easily reset his plow to the exact same depth of operation as formerly by rotating the hand winch the same number of turns in an opposite direction. This feature gives him complete control of the operating depth of the implement and knowledge of the operating depth being used without having to refer back to the implement by visual inspection. Hydraulic lift mechanisms which are well known to the art do not provide this feature, and it is necessary for the operator to visually adjust the operating depth of his implement after change.

My new apparatus is simple and versatile so that it can be easily installed on any type of plow or the like without the necessity of making any changes in the structure of the implement itself. The winch mechanism is easily adaptable to any type of tractor seat arrangement or the like, the remainder of the apparatus is quite easily and removably installable on an implement. The simplicity of my apparatus, of course, allows it to be manufactured much more economically than the apparatus known to the prior art. It also allows an ordinary user without any particular training or skill to install, operate, and repair my invention without the necessity of special knowledges and tools.

It is an object of my invention to provide a new apparatus for controlling depth of an earthworking implement.

Another object of my invention is to provide a new apparatus for controlling the depth of any earthworking implement while moving.

Still another object of my invention is to provide a new apparatus to control the depth of an earthworking implement which allows the operator to return the implement to a given setting without the necessity of visual inspection or stopping of the vehicle.

And yet another object of my invention is to provide a new apparatus for controlling the depth of an earthworking implement which is sufficiently versatile to be readily installed on many types of implements without the necessity of making any changes to the implement.

And still another object of my invention is to provide a new apparatus for controlling the depth of an earthworking implement which is economical to manufacture.

Various other objects, advantages, and features of the invention will become apparent to those skilled in the art from reading this disclosure.

Drawings accompany and are a part of this disclosure. These drawings depict preferred specific embodiments of the depth control apparatus of my invention, and it is to be understood that these drawings are not to unduly limit the scope of the invention. In the drawings, FIG. 1 is a side elevation showing the apparatus of my invention mounted on a plow and tractor.

Figure 1:
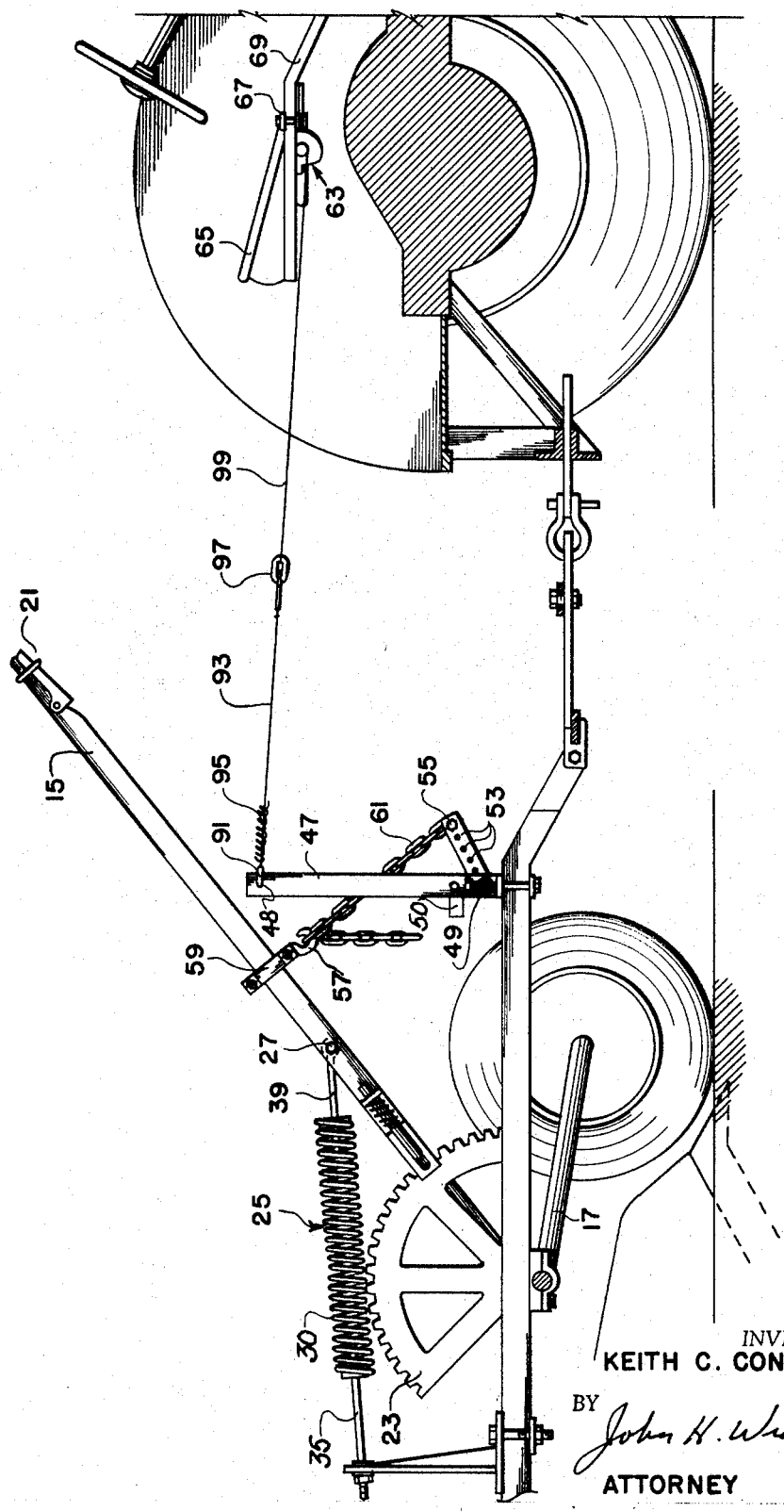
Figure 2:
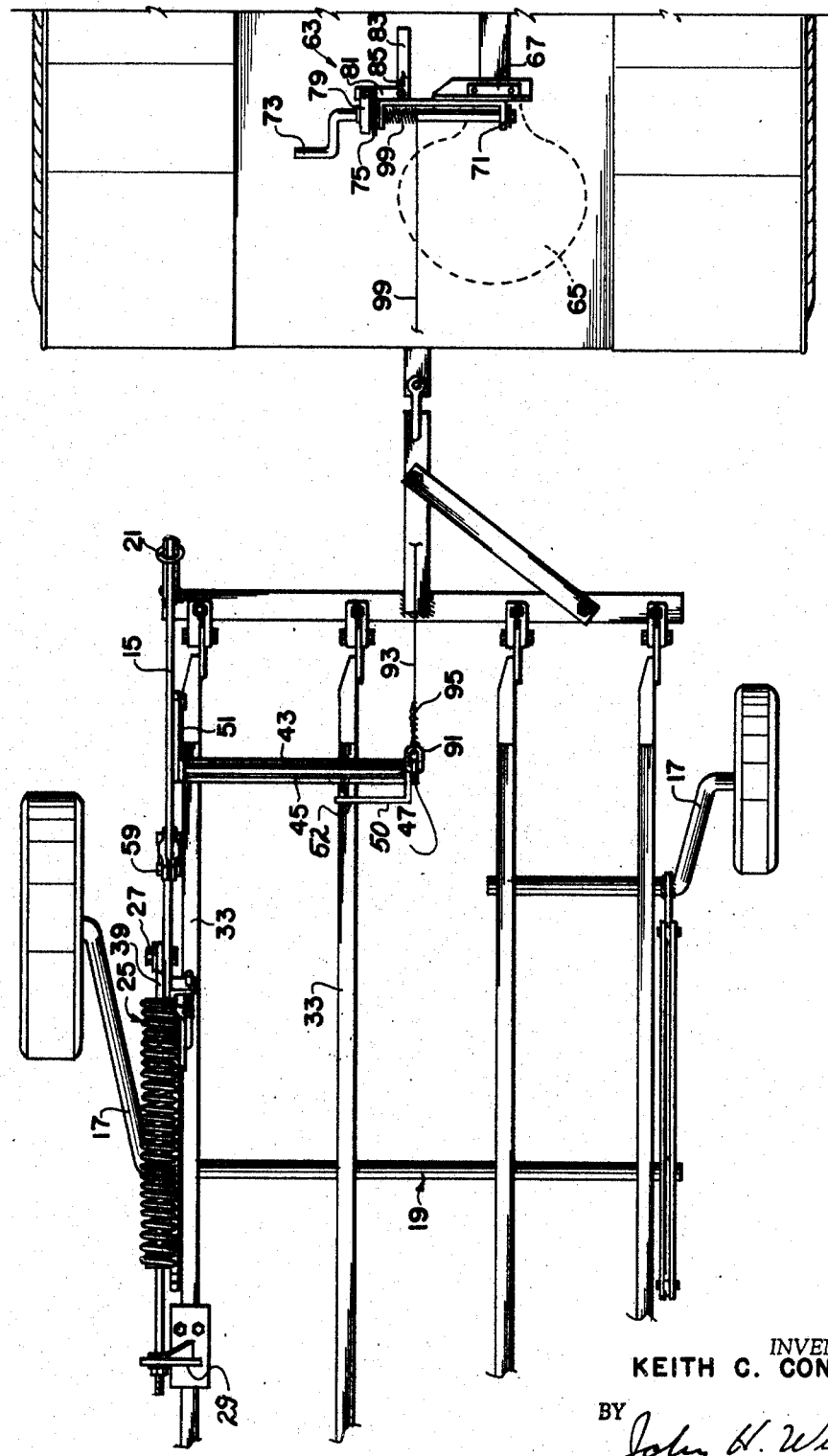
FIG. 2 is a top plan view of the apparatus of my invention mounted on a plow and tractor.

In the following is a discussion and description of the invention made with reference to the drawings whereon the same reference numerals are used to indicate the same or similar parts and/or structure. The discussion and description is of preferred specific embodiments of the new depth control apparatus of my invention and it is to be understood that the discussion and description is not to unduly limit the scope of the invention.

Referring now to the drawings in detail, FIG. 1 shows the side elevation of a part of a moldboard plow showing the depth adjusting lever 15 which is standard equipment with a plow of this type. In operation, this lever 15 is operably connected to the crank axle 17 of the plow to change the depth of operation thereof. Both axles of the plow are rotated by a connecting means generally referred to at 19 which is standard equipment on an implement of this type. When the apparatus of my invention is installed for use, a ring 21 is placed over the release mechanism of the lever 15 of the plow to hold it in a disengaged position from the ratchet 23.

Means to urge the lever 15 to rotate the crank axle 17 upwardly are provided by my invention. These means can be of any suitable means such as resilient means, a piston and cylinder arrangement, or the like but preferably a helical spring assembly 25 having one end pivotally connected to the lever 15 by preferably bolt means 27. A generally L-shaped bracket 29 is preferably mounted by a clamp means 31 on a longitudinal member 33 of the plow. The upwardly projecting end portion of the brace 29 has a hole in the top portion thereof. A threaded rod 35 is mounted in the last-named hole and projects therethrough. A nut 37 is threaded on the rod 35 and adjustably secures the rod 35 to the flange 29. The forwardly projecting end portion of the rod 35 is threaded into one end portion of a helical spring 30. The other end portion of the spring 30 has a threadedly mounted eye bolt 39 therein which is pivotally connected to the lever 15 by the bolts 27. It is apparent that this arrangement allows for a great versatilty of adjustment of the spring 30 tension either by shifting the positioning of clamp 31 on beam 33 or rotating the threaded rod 35 to increase or decrease the distance between the bracket 29 and the helical spring 30. A brace 41 is mounted between the L-saped portions of the mounting bracket 29 to provide additional strength therefore.

Figures 3, 4:
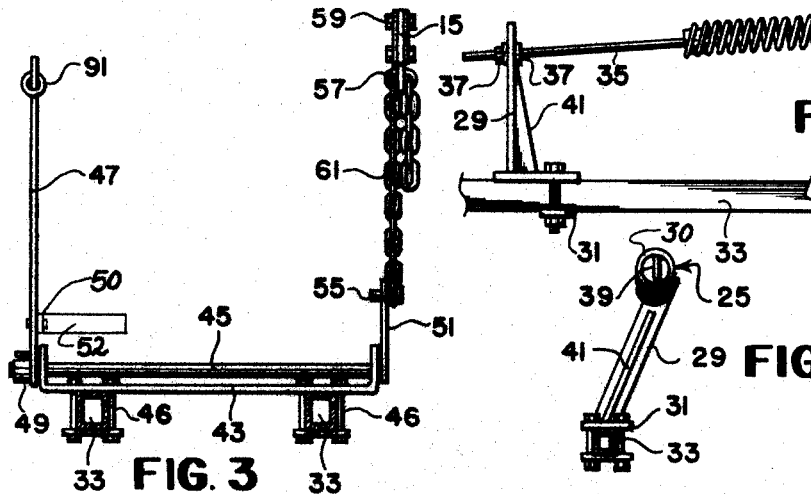
FIG. 3 is a front elevation of the actuating means of my invention mounted on an implement and connected to the lever means of the implement.
FIG. 4 is a side elevation of the mounting bracket and helical spring of the means to move the lever means.
Figure 5:
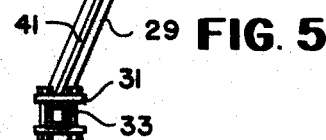
FIG. 5 is an end view of the mounting bracket and helical spring illustrated in FIG. 4.
Figure 6:
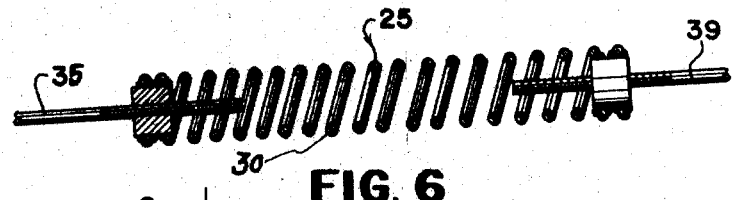
FIG. 6 is a view taken in cross section of the helical spring of FIG. 4.

The actuating means of the invention as best shown on FIG. 3 has an elongated channel-shaped bracket 43 mounted by clamps 46 on two longitudinal members 33 of the plow. The upwardly projecting end portions of the last-named bracket 43 have a hole therethrough. A rod 45 is rotatably mounted in the holes of the bracket 43 and project therethrough. This rod 45 is preferably of a diameter slightly less than the diameter of the last-named holes in the bracket 43. A lever 47 is secured on the inwardly projecting end portion of the rod 45 but is angularly adjustable relative thereto. This lever 47 can be mounted in any suitable manner but preferably by a collar and set screw means 49. A connecting ring hole 48 is in the upwardly projecting end portion of the lever 47. An L-shaped stop arm 50 bolted to the lever 47 is positioned above the rod 45. The stop arm 50 has a leg 52 extended over an adjacent one of the longitudinal members 33 for reasons to be explained.

A relatively short connecting lever 51 is rigidly mounted on the outwardly projecting end portion of the rod 45. The connecting lever 51 can be mounted on the rod 45 in any suitable manner such as screw means, welding, or the like but preferably by welding. The connecting lever 51 has a plurality of longitudinally spaced holes 53 positioned along the center line thereof. These holes 53 provide a further adjusting means on the apparatus of my invention. A connecting bolt 55 can be mounted in any one of the holes 53 depending upon the type of implement on which my apparatus is being used, the degree of depth control desired by the operator, the tension of the spring 30, and so forth. A hook 57 is mounted on the plow lever 15 by an adjustable clamp 59. This clamp 59 is preferably positioned in a generally central portion of the lever 15 but here again a provision is made for further versatility in adjustment of my apparatus as hereinbefore described. One end of a chain 61 is connected to the bolt 55 for pivotal movement and the other end of the chain 61 is adjustably connected to the lever 15 by the hook 57. This arrangement, of course, provides the adjustment to define the range of depth of operation of the implement. If the operator desires to raise the operating depth of the implement, he need only to shorten the operable length of the chain 61 between the hook 57 and the lever 53 by securing another link of the chain 61 in the hook 57. This connecting means can be of any suitable kind other than the chain hereinbefore described such as a cable, rope, rod means, or the like but it has been found that a chain works excellently in practice.

The control means of the apparatus consists of a hand winch generally referred to at 63 which is mountable under a tractor seat 65. Hand winches are well known to the art and any suitable type can be used in the apparatus of my invention. I have found in practice that the hand winch 63 in the preferred specific embodiment of my invention has produced excellent results in practice. The winch 63 in the preferred specific embodiment has a mounting device which has a mounting clamp portion 67 which is clamped onto a seat support 69 immediately forward of the seat 65. This clamp 67 is rigidly secured to an elongated U-shaped mounting bracket 71. The bracket 71 has a hole in each end portion and a crank handle 73, which is of a diameter slightly less than the diameter of the holes in the bracket 71, is mounted in the holes of bracket 71 and projects therethrough. Bearings 87 can be mounted between the holes in the bracket 71 and the crank handle 73. These bearings can be of any suitable type such as bronze, sleeve, ball, roller or the like but preferably of a bronze sleeve bearing. A securing collar 89 is mounted on the inwardly projecting end portion of the crank 73 to maintain the crank handle 73 in the bracket 71. The portion of the crank handle 73 between the last-named holes forms a spool. When properly mounted, it has been found in practice that a cable will wind on the aforesaid spool in a satisfactory manner. However, in some uses, it can be desirable to have a cable guiding aid for use in connection therewith such as a grooved spool, adjustable guide, a bar placed in close proximity with the spool to prevent overlying of the cable, or the like.

A notched wheel or disc 75 is secured as by welding to a brake cylinder 77 and the unit is secured as by a set screw means or locking key means to the crank handle 73. The notched wheel 75 is mounted on the crank 73 outwardly from and adjacent to the outwardly projecting end portion of the bracket 71. This wheel 75 can have any number of notches therein, but preferably two. The brake cylinder 77 can be of any suitable type such as fiber, asbestos, or the like, but preferably of a rough material well known to the art. A brake band or loop 79 is mounted about the brake cylinder 77 and projects generally around substantially the entire periphery thereof. A stop lever bracket 81 is rigidly mounted on the top portion of the bracket 71 preferably by welding. This stop lever bracket 81 has a hole in one end portion thereof. A generally L-shaped stop lever 83 is pivotally mounted on a bolt within the last-named hole of the slotted bracket 81. The stop lever 83 is adapted to engage a notch on the notched wheel 75 when in the latched or inactive position. A helical spring 85 is mounted between the stop lever 83 and the bracket 71 urging the stop lever into the latched position to engage a notch on the wheel 75. The brake 77 and the brake band 79 cooperate to preclude the possibility of crank 73 spinning out of control when the stop lever 83 is disengaged from the notched wheel 75.

To connect the winch 63 to the lever 47, a ring 91 is preferably mounted in the ring hole 48 of the lever 47. One end portion of a cable 93 is rigidly secured to a helical spring 95 which is mounted in tension between the cable 93 and the ring 91 connected to the lever 47. Of course any resilient means can be used in place of spring 95 which operates to maintain a tension on the cable 93 particularly when turning corners when the distance between the tractor seat 65 and the lever 47 is decreased. In the preferred specific embodiment the other end portion of the cable 93 is connected to a safety link 97 which is constructed and adapted to open and separate in the event of an emergency and at times whe the implement is being separated from the tractor. One end portion of another cable 99 is secured to the safety ring 97 with the other end portion thereof mounted on the spool portion of the crank handle 73 of the winch 63.

Figure 7:
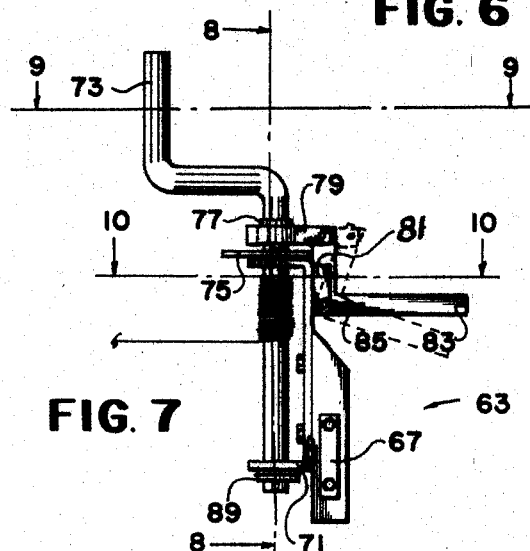
FIG. 7 is a back elevation of the hand winch apparatus of the invention.
Figure 8:
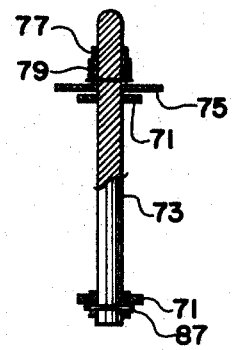
FIG. 8 is a view in cross section taken along line 8—8 of FIG. 7.

In the use and operation of my invention, the earthworking implement is held in the raised position by the winch 63, cables 99, 95, lever 47, chain 61, and actuating lever 15 and pulled into the fields by a farm tractor to a location where the operator desires to work the earth. The operator rotates the stop lever 83, as shown in dotted lines in FIG. 7, whereupon the lever 83 moves out of the notch in th wheel 75 to force the crank handle 73 for rotation and resultant lowering of the implement. The larger weight of the emplement would rapidly rotate the crank handle 73 presenting a dangerous situation except for the brake band 79 engaging the brake cylinder 77. It is seen that this engagement operates to retard if not stop the rotation of the crank handle 73, and the speed of lowering the implement can be completely controlled by the operator's pressure on the stop lever 83. It is seen therefore, that the lowering of the implement is a braking action to retard movement thereof.

On reaching the preselected depth of operation, the stop arm 50 engages the frame member 33 whereupon the operator releases the stop lever 83 and the spring 85 returns the lever 83 to a latched position in engagement with a notch on the wheel 75. Variation in the preselected depth of operation is readily adjustable on movement of another link of the chain 61 onto the hook 57.

Figure 9:
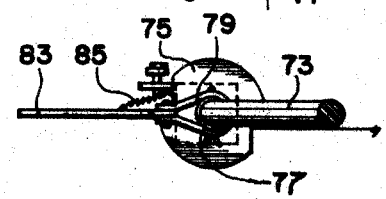
FIG. 9 is a view taken in cross section taken along line 9—9 of FIG. 7.
Figure 10:
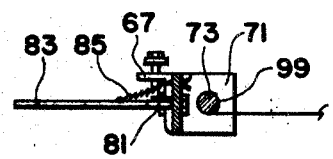
FIG. 10 is a view taken in cross section along line 10—10 of FIG. 7.

Raising of the implement for travel, compensation in irregular terrain, or soil consistency variation is achieved by rotation of the crank handle 73 in a counter clockwise direction, as viewed in FIG. 9 whereby the cable 99 is wound on the spool of the crank handle 73 to rotate the levers 47 and 15. The stop lever 83 moves under spring 85 tension into the next adjacent notch to continuously maintain the crank handle 73 in a latched or safety position.

It is obvious that the invention is readily adapted to conventional earthworking implements having the standard upright actuator lever. This invention permits the operator to raise and lower the implement with the use of only one hand which is extremely desirable as a time saving and safety feature. This novel invention also allows the operator to remain on the tractor seat and make these adjustments while the tractor is in motion.

The material used in the apparatus of my invention can be of any suitable kind, but preferably those used in the fabrication of implements of this type, such as iron and steel.

I claim:

1. On an earthworking implement having a crank axle and a lever means connected to said axle to rotate said axle to adjust the depth of operation of said implement, that improvement comprising, in combination, means to move said lever means mountable between said implement and said lever means to act to urge said crank axle into elevated position, actuating means mountable on said implement and having means to connect same to said lever means, control means mountable on a tractor seat or the like, and connecting means operably mountable between said control means and said actuating means, said means to move said lever means, said means to move said lever means comprises a helical spring operably mounted in tension between said lever means and said implement and wherein said actuating means is a lever pivotally mounted on a front portion of said implement and wherein said means to connect comprises in combination a hook rigidly mounted on said lever means, a connecting lever rigidly mounted on said actuating means having adjusting holes therein, and a chain adjustably and operably connected between said connecting lever and said hook, and wherein said control means is a hand winch apparatus, and said connecting means is a flexible means operably mounted between a top portion of said actuating means lever, and said hand winch, said improvement constructed and adapted when mounted to operate to change the operating depth of the tool of the earthworking implement.

2. That improvement according to claim 1 wherein said lever means is adjustably secured to the implement and said means to move said lever means comprises a generally L-shaped mounting bracket mounted on said implement by bolt means and projecting generally upwardly therefrom, having a brace mounted between the upwardly projecting portion and the horizontal portion thereof, there being a hole in the top portion of said upwardly projecting portion, a threaded rod projecting through said hole and rigidly mounted therein by a nut threadably mounted on each side of said upwardly projecting flange portion, said helical spring threadably mounted on the forwardly projecting end portion of said threaded rod, an eye bolt threadably mounted in the forwardly projecting end portion of said helical spring, said eye bolt pivotally mounted on a lower portion of said lever means, and wherein a ring is removably mounted on the outwardly projecting end portion of said lever means to hold said lever means in disengaged position, said actuating means comprising an elongated channel-shaped bracket transversely and rigidly mounted on at least two longitudinal members of said implement, said bracket having a hole in each upwardly projecting end portion thereof, a rod rotatably mounted in said bracket holes, said lever rigidly mounted on the inwardly projecting end portion of said rod and extending upwardly therefrom, there being a hole in the upwardly projecting end portion of said lever, and wherein said means to connect comprises said connecting lever rigidly mounted on the outwardly projecting end portion of said rod, said connecting bolt mounted in one of said holes, said hook rigidly mounted on a central portion of said lever means and depending generally downwardly therefrom, and wherein said control means comprises said hand winch rigidly mountable on a tractor seat or the like, by an elongated channel-shaped mounting bracket and clamp means, said bracket having a hole through each depending end portion thereof, a crank rotatably mounted through said last-named holes, the portion of said crank between said holes being substantially horizontal and forming a spool, a notched wheel rigidly mounted on a projecting end portion of said crank immediately adjacent one of said holes, a brake operably mounted adjacent said notched wheel on said crank, an arm rigidly mounted on said brake and generally projecting therefrom, a stop lever slotted bracket rigidly mounted on said mounting bracket, an L-shaped stop lever pivotally mounted on an end portion of said slotted bracket, said stop lever constructed to engage a notch on said notched wheel, a helical spring is operably connected between said stop lever on said mounting bracket urging said stop lever into the engaged position and wherein said connecting means comprises a ring operably mounted in the upwardly projecting end portion of said lever of said actuating means, a cable mounted on said last-named ring, a helical spring mounted between said cable and said last-named lever, the other end portion of said cable mounted on said spool portion of said crank of said winch, said improvement constructed and adapted to rotate said crank axles of said implement by turning the crank of said winch, said cable actuating said lever, said means to connect actuating said lever means, and said lever means rotating said crank axle.

3. On an earthworking implement having a crank axle and a lever means connected to said axle to rotate said axle to adjust the depth of operation of said implement, that improvement comprising, in combination, means to move said lever means mountable between said implement and said lever means to act to urge said crank axle into elevated position, actuating means mountable on said implement and having means to connect same to said lever means, control means mountable on a tractor seat or the like, and connecting means operably mountable between said control means and said actuating means, said means to move said lever means, said actuating means, and said control means constructed and adapted when mounted to operate to change the operating depth of the tool of the earthworking implement, said means to move said lever means comprises a resilient means mounted in tension between said lever means and said implement, wherein said actuating means is a lever pivotally mounted on said implement, wherein said means to connect comprises, in combination, a connector means mounted on said lever means, a connecting bar rigidly mounted on said lever, and an adjustable chain means operably connected between said connecting bar and said connector means, and said control means is a winch apparatus, and said connecting means is a flexible line operably mounted between said actuating means lever and said winch apparatus.

4. That improvement according to claim 3, wherein said winch apparatus rigidly mountable on a tractor seat by a mounting bracket and clamp means, a crank rotatably mounted on said bracket, and a brake mounted on said crank selectively operably to control movement of flexible implement.

5. That improvement according to claim 4, wherein said lever means and crank axle have disengageable normally engaged means with a hand operator therefor on the outer end portion of said lever means to maintain said crank axle in the desired position, and a ring removably mountable on said outer end portion of said lever means to hold when mounted said hand operator in disengaged position.

References Cited
UNITED STATES PATENTS

| | | | |
|---|---|---|---|
| 2,344,123 | 3/1944 | Brown et al. | 172—318 |
| 2,369,437 | 2/1945 | Court | 172—318 |

ROBERT E. PULFREY, Primary Examiner

J. W. PETERSON, Assistant Examiner

U.S. Cl. X.R.

74—501, 522.5; 172—423; 254—175.7

UNITED STATES PATENT OFFICE
CERTIFICATE OF CORRECTION

Patent No. 3,477,519                         November 11, 1969

Keith C. Converse

It is certified that error appears in the above identified patent and that said Letters Patent are hereby corrected as shown below:

Column 3, line 43, "saped" should read -- shaped --. Column 5, line 12, "whee" should read -- when --; line 24, "th" should read -- the --; line 74, cancel "said means to move said lever means,". Column 8, line 8, after "flexible" insert -- line mounted thereon and interconnected earthworking --.

Signed and sealed this 15th day of September 1970.

(AL)

est:

rard M. Fletcher, Jr.                         WILLIAM E. SCHUYLER, JR.
esting Officer                                       Commissioner of Patents